United States Patent
Krensky

(10) Patent No.: US 10,696,256 B2
(45) Date of Patent: Jun. 30, 2020

(54) BUMPER PROTECTION APPARATUS

(71) Applicant: Robert Krensky, Toronto (CA)

(72) Inventor: Robert Krensky, Toronto (CA)

( * ) Notice: Subject to any disclaimer, the term of this patent is extended or adjusted under 35 U.S.C. 154(b) by 141 days.

(21) Appl. No.: 15/958,283

(22) Filed: Apr. 20, 2018

(65) Prior Publication Data
US 2018/0304842 A1 Oct. 25, 2018

Related U.S. Application Data

(60) Provisional application No. 62/487,803, filed on Apr. 20, 2017.

(51) Int. Cl.
*B60R 19/50* (2006.01)
*B60R 19/44* (2006.01)
*B60R 13/10* (2006.01)
*F16F 1/36* (2006.01)

(52) U.S. Cl.
CPC ............ *B60R 19/50* (2013.01); *B60R 13/105* (2013.01); *B60R 19/44* (2013.01); *F16F 1/36* (2013.01)

(58) Field of Classification Search
CPC ....... B60R 13/10; B60R 13/105; B60R 19/44; B60R 19/50
USPC .......................................... 293/108, 117, 142
See application file for complete search history.

(56) References Cited

U.S. PATENT DOCUMENTS

| | | | | |
|---|---|---|---|---|
| 1,740,528 A | * | 12/1929 | Veale | B60R 19/28 293/146 |
| 2,243,462 A | * | 5/1941 | Fageol | B60R 19/44 293/108 |
| 2,257,495 A | * | 9/1941 | Fageol | B60R 19/44 293/108 |
| 5,904,386 A | * | 5/1999 | Buchman | B60R 19/44 293/136 |
| 2006/0191173 A1 | * | 8/2006 | Levine | B60R 13/10 40/209 |
| 2017/0355334 A1 | * | 12/2017 | Prevor | B60R 19/445 |

FOREIGN PATENT DOCUMENTS

FR 1217807 A * 5/1960 ............. B60R 19/44

OTHER PUBLICATIONS

English translation of FR 1,217,807; retreived on Nov. 6, 2019 via PatentTranslate located at www.epo.org. (Year: 2019).*

* cited by examiner

*Primary Examiner* — Jason S Daniels
(74) *Attorney, Agent, or Firm* — Grossman, Tucker, Perreault & Pfleger, PLLC

(57) ABSTRACT

A bumper protection apparatus, the apparatus comprising: an anchor body having an exterior top wall, an exterior bottom wall, and an exterior side wall extending therebetween; the top wall comprising a top recessed annular section with top interior peripheral wall, and a bottom recessed annular section with bottom interior peripheral wall, and an annular shoulder separating the top interior peripheral wall and the bottom interior peripheral wall, to form a generally graduated cylindrical void bottom within the anchor body; a base wall formed with bottom interior peripheral wall, the base wall being opposite to exterior bottom wall; the base wall having an aperture extending therefrom to exterior bottom wall; and a cover comprising an exterior cover wall and an interior cover wall with an edge wall therebetween, the cover dimensioned to fit snugly in the anchor body within the top recessed annular section.

18 Claims, 12 Drawing Sheets

BUMPER PROTECTION APPARATUS

CROSS-REFERENCE TO RELATED APPLICATIONS

This application claims the benefit of priority to U.S. Provisional Application Ser. No. 62/487,803, filed on Apr. 20, 2017.

FIELD OF THE INVENTION

The present invention relates to a bumper protection apparatus, more particularly it pertains to a resilient fastener housing assembly for use with vehicle registration plates.

BACKGROUND

In most jurisdictions all roadworthy vehicles or trailers are required by law to be registered with an appropriate governmental for official identification purposes. Accordingly, such vehicles are assigned a unique registration identifier, which may be numeric and/or alphanumeric, that uniquely identifies the vehicle owner within the issuing region's database. The unique registration identifier is printed or embossed onto a vehicle registration plate which is affixed onto the vehicle or trailer, along with a plate renewal sticker that must be renewed and replaced periodically.

Typically, the vehicle registration plate is affixed to the front and back of the vehicle, however, however, some jurisdictions only require the plate to be located at the back of the vehicle. The plates are usually fixed directly to a vehicle or to a plate frame that is fixed to the vehicle via two or more metal screws that are screwed into bumpers of the vehicle. The screw heads of the screws typically rest on top of the plate or plate frame, and therefore are exposed. When parallel parking it is not uncommon to tap the parked vehicle in front or behind, and those seemingly innocuous light taps cause the exposed screw heads to come into contact with the bumpers of the parked vehicles, resulting in scratches, scuffs and dents. Also, when driving in bumper to bumper traffic conditions the damage caused by tapping another vehicle's bumper is magnified. Fixing damaged bumpers involves grinding, sanding, sculpting and painting, which can be costly, time consuming, and can often exceed the insurance deductible for certain vehicles. In addition, for a typical driver the likelihood of such taps is extremely high, and can occur each time one parallel parks or drives in bumper to bumper traffic, and therefore these repair costs may become prohibitive, and often forces some drivers forego repairs and maintain the damaged bumpers in their unsightly states.

Furthermore, since the screw heads are exposed to exposure to rain, snow or road salt, they are susceptible to corrosion or rust. For drivers that use the plate frame and cover, the plate frame and cover must be removed in order to place a replacement plate renewal sticker. Rusted screws may be difficult to remove, and may require to be drilled out of the bumper by a mechanic in order to access the plate, which can be costly and inconvenient.

It is an object of the present invention to mitigate or obviate at least one of the above-mentioned disadvantages.

SUMMARY OF THE INVENTION

In one of its aspects, there is provided a bumper protection apparatus, said apparatus comprising:
  an anchor body;
  a cover;
  the anchor body comprising an exterior top wall, an exterior bottom wall, and an exterior side wall extending therebetween, wherein the exterior top wall comprises a recessed annular section with a base wall, and an aperture extending between the base wall and the exterior bottom wall; and
  wherein the cover is received by the recessed annular section.

In another of its aspects, there is provided a method for minimizing damage to a vehicle, said method comprising:
  positioning a license plate having at least one aperture against a bumper;
  positioning at least one anchor body on the bumper, the anchor body comprising an exterior top wall, an exterior bottom wall, and an exterior side wall extending therebetween; wherein the exterior top wall comprises a recessed annular section with a base wall; and an orifice extending between the base wall and the exterior bottom wall; wherein the recessed annular section comprises an upper section with an upper interior peripheral wall and a lower section with a bottom interior peripheral wall connected to the upper interior peripheral wall by an annular ledge;
  aligning the orifice of the least one anchor body with the at least one aperture of the license plate;
  introducing a fastener comprising a head portion and shank portion into at least one anchor body such that the shank portion is received by the orifice and at least one aperture and secured with the bumper until the head portion abuts the annular ledge; and
  securing a cover in the upper section of the recessed annular section.

In one of its aspects, there is provided a bumper protection apparatus said apparatus comprising:
  an anchor body having an exterior top wall, an exterior bottom wall, and an exterior side wall extending therebetween;
  said top wall comprising a top recessed annular section with top interior peripheral wall, and a bottom recessed annular section with bottom interior peripheral wall, and an annular shoulder separating said top interior peripheral wall and said bottom interior peripheral wall, to form a generally graduated cylindrical void bottom within said anchor body;
  a base wall formed with bottom interior peripheral wall, said base wall opposite to exterior bottom wall; said base wall having an aperture extending therefrom to exterior bottom wall; and
  a cover comprising an exterior cover wall and an interior cover wall with an edge wall therebetween, said cover dimensioned to fit in said anchor body within said top recessed annular section such that said cover is generally contiguous with said top wall to form a substantially flat, planar surface.

In one of its aspects, there is provided a fastener housing assembly comprising:
  an anchor body;
  a cover;
  the anchor body comprising an exterior top wall, an exterior bottom wall, and an exterior side wall extending therebetween, wherein the exterior top wall comprises a recessed annular section with a base wall, and an aperture extending between the base wall and the exterior bottom wall; wherein
  the recessed annular section comprises an upper section with an upper interior peripheral wall and a lower section with a bottom interior peripheral wall connected to the upper interior peripheral wall by an annular ledge; and wherein the cover is received by the recessed annular section.

Advantageously, the apparatus conceals the head portion of the fastener with the anchor body, such that in the event of an impact with another vehicle, the head portion of the fastener does not come into contact with the other vehicle, thereby minimizing damage to the other vehicle. In addition, the cover substantially protects the fastener from the elements and debris, thereby minimizing corrosion or degradation of fastener.

BRIEF DESCRIPTION OF THE DRAWINGS

Several exemplary embodiments of the present invention will now be described, by way of example only, with reference to the appended drawings in which.

DETAILED DESCRIPTION

The detailed description of exemplary embodiments of the invention herein makes reference to the accompanying block diagrams and schematic diagrams, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Connecting lines shown in the various figures contained herein are intended to represent exemplary functional relationships and/or physical couplings between the various elements. It should be noted that many alternative or additional functional relationships or physical connections may be present in a practical system.

Figure 1:
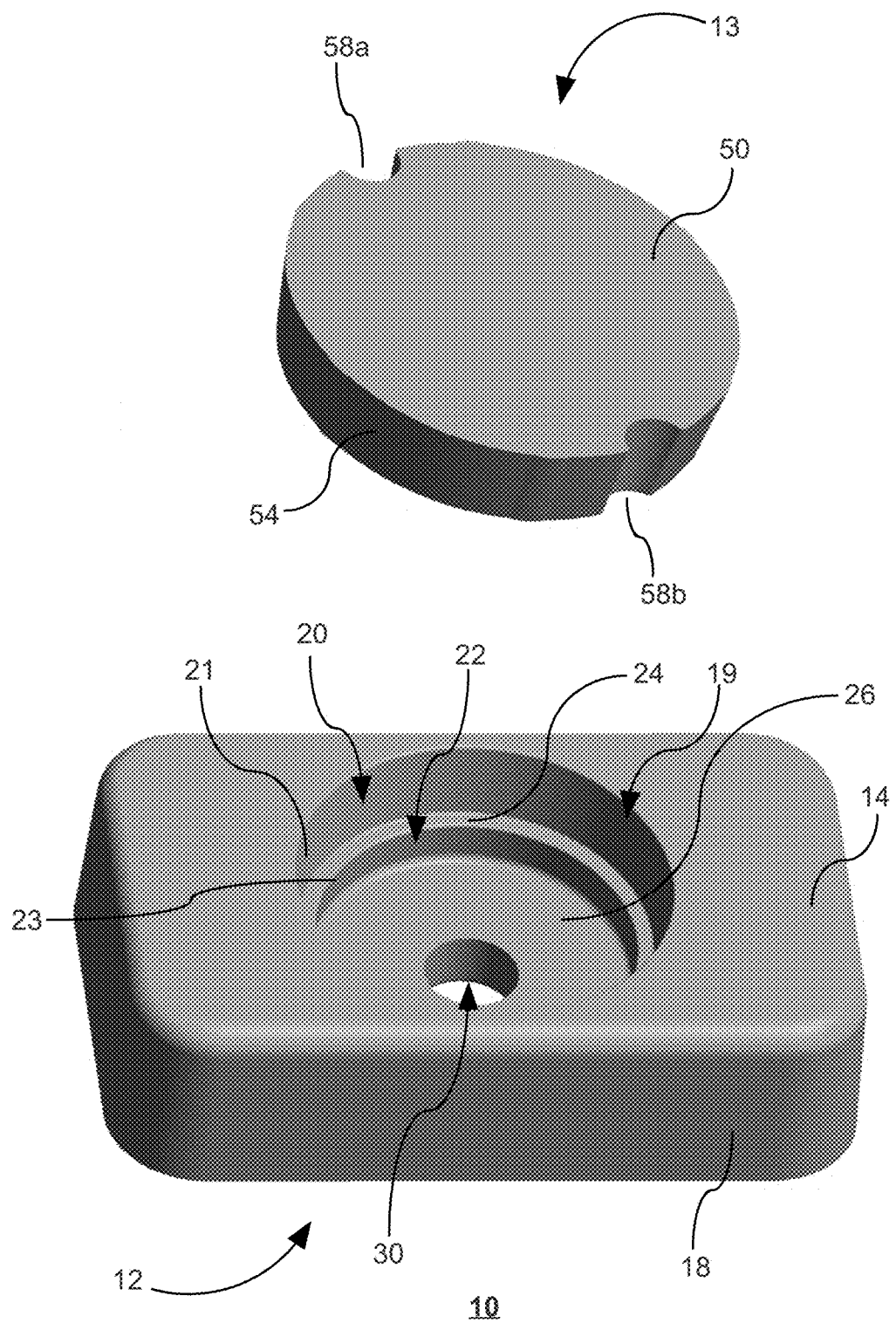
FIG. 1 shows a perspective front view of a bumper protection apparatus, in one exemplary embodiment.
Figure 2A:
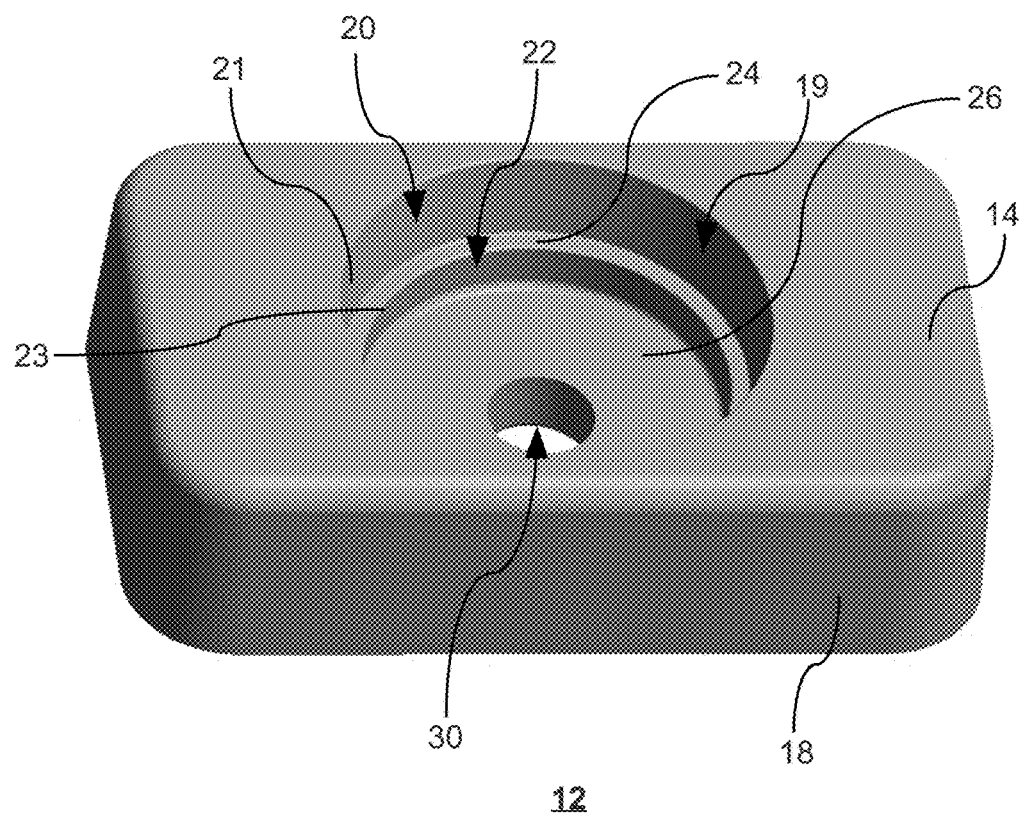
FIGS. 2a-2g show various views of an anchor body.
Figure 2B:
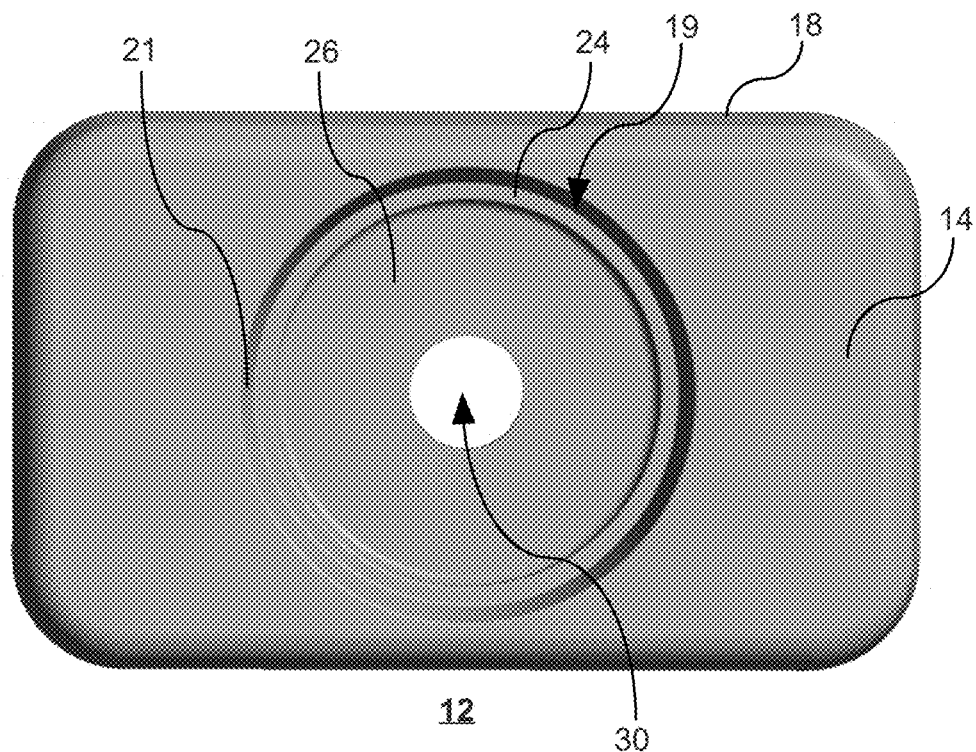
Figure 2C:
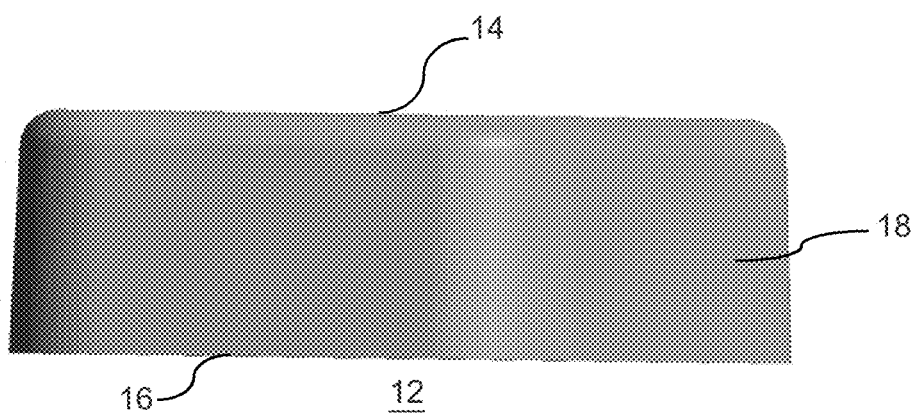
Figure 2D:
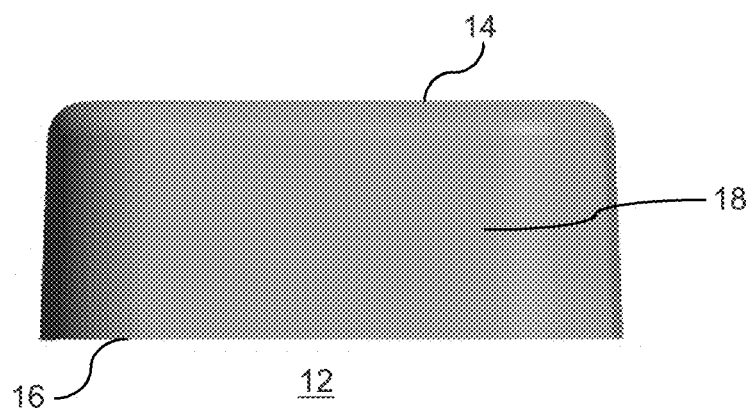
Figure 2E:
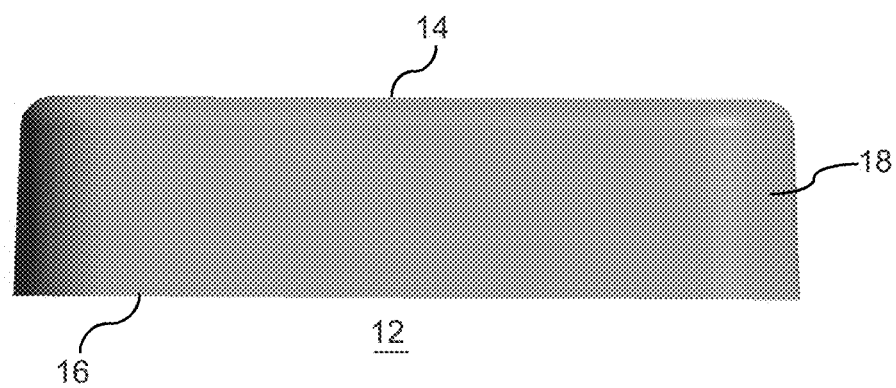
Figure 2F:
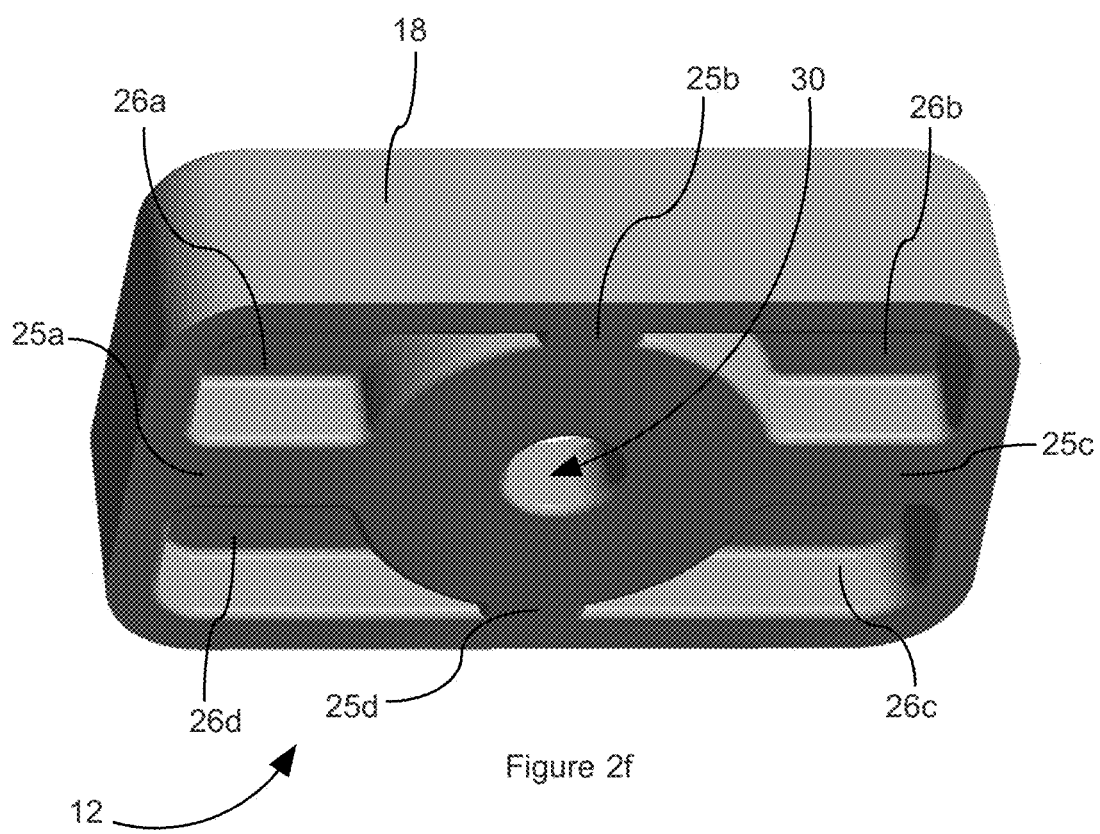
Figure 2G:
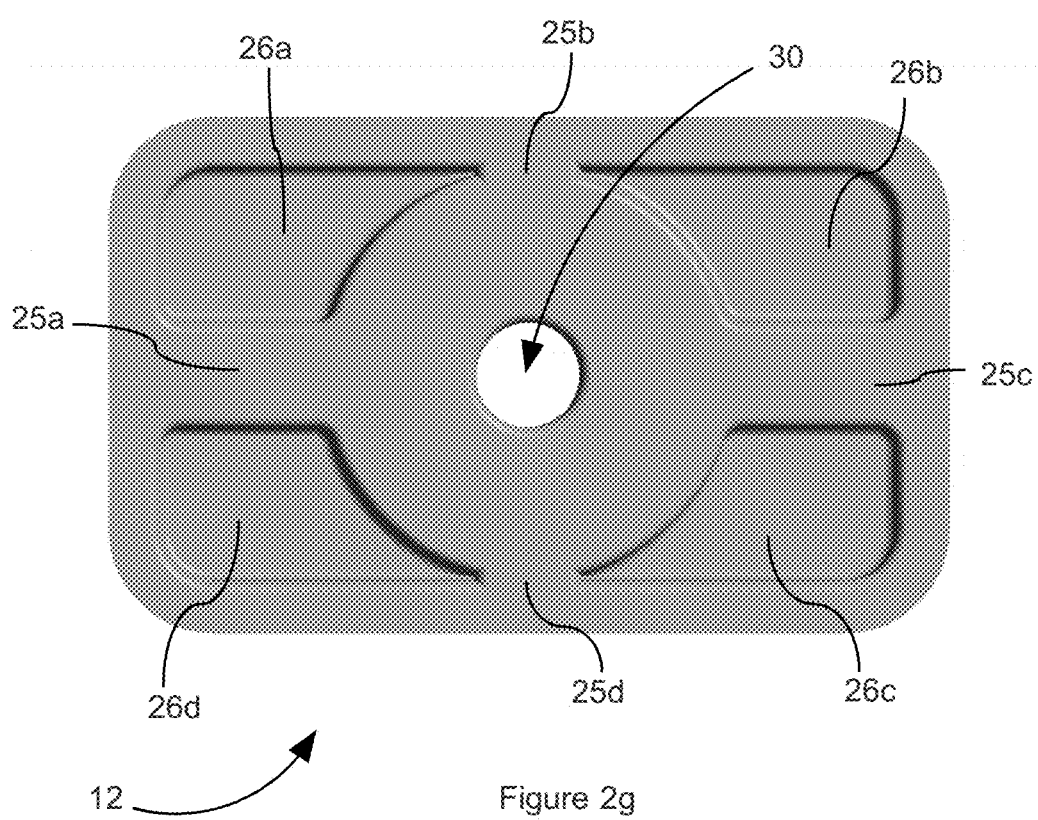
Figure 3A:
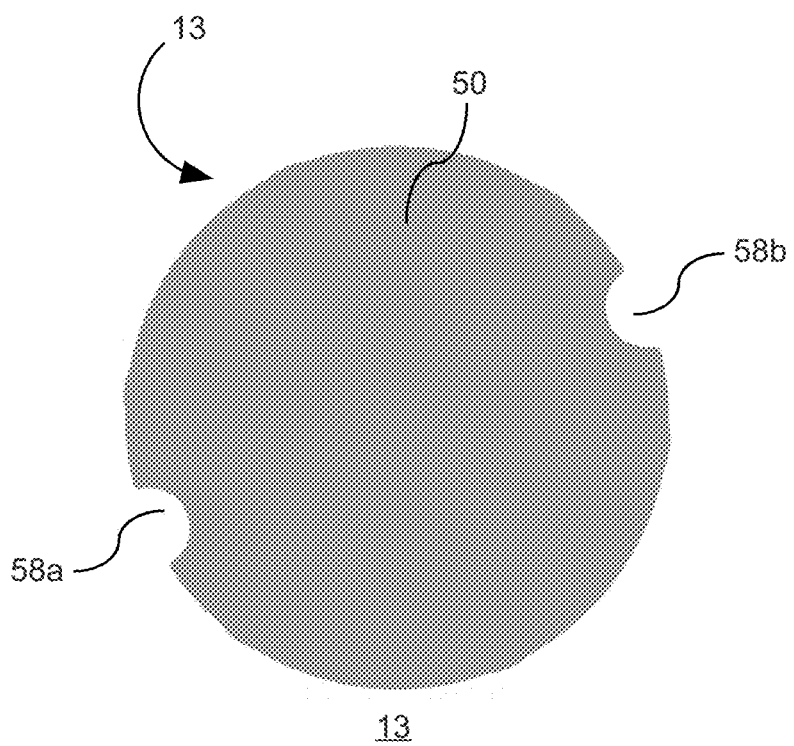
FIGS. 3a-3h show various views of a cover.
Figure 3B:
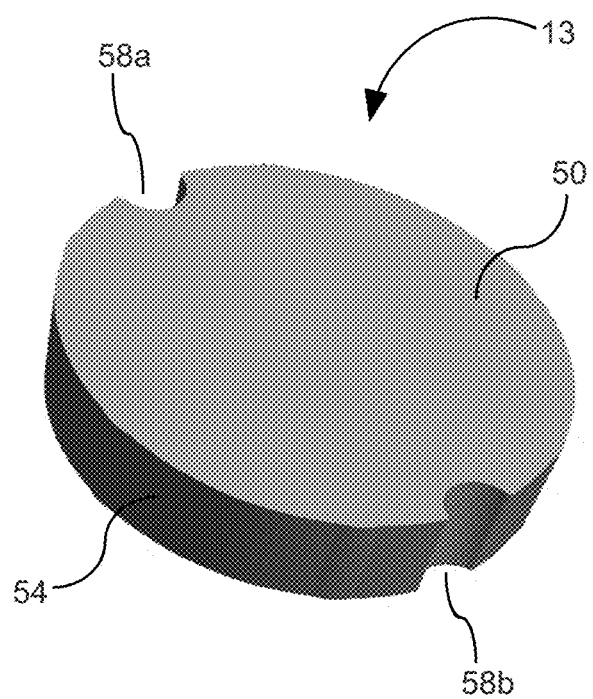
Figure 3C:
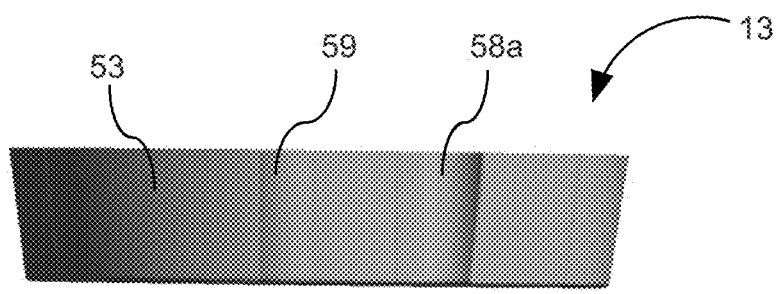
Figure 3D:
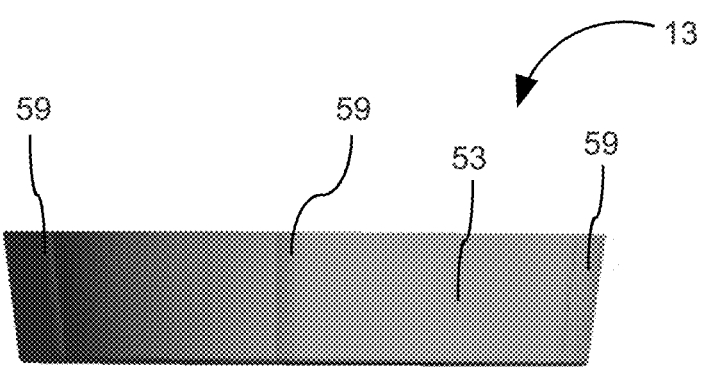
Figure 3E:
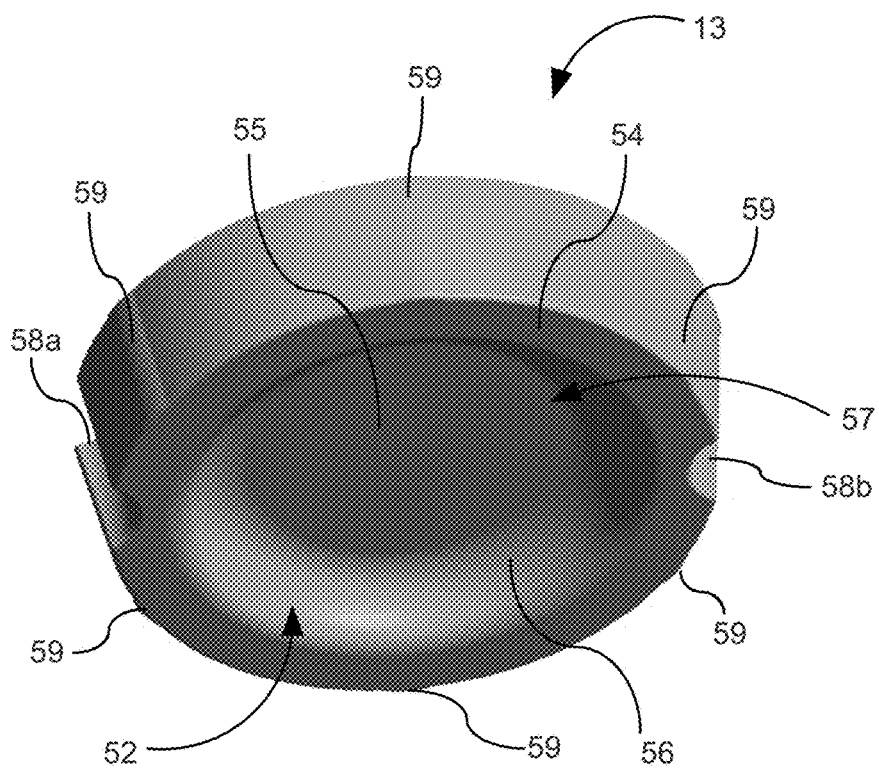
Figure 3F:
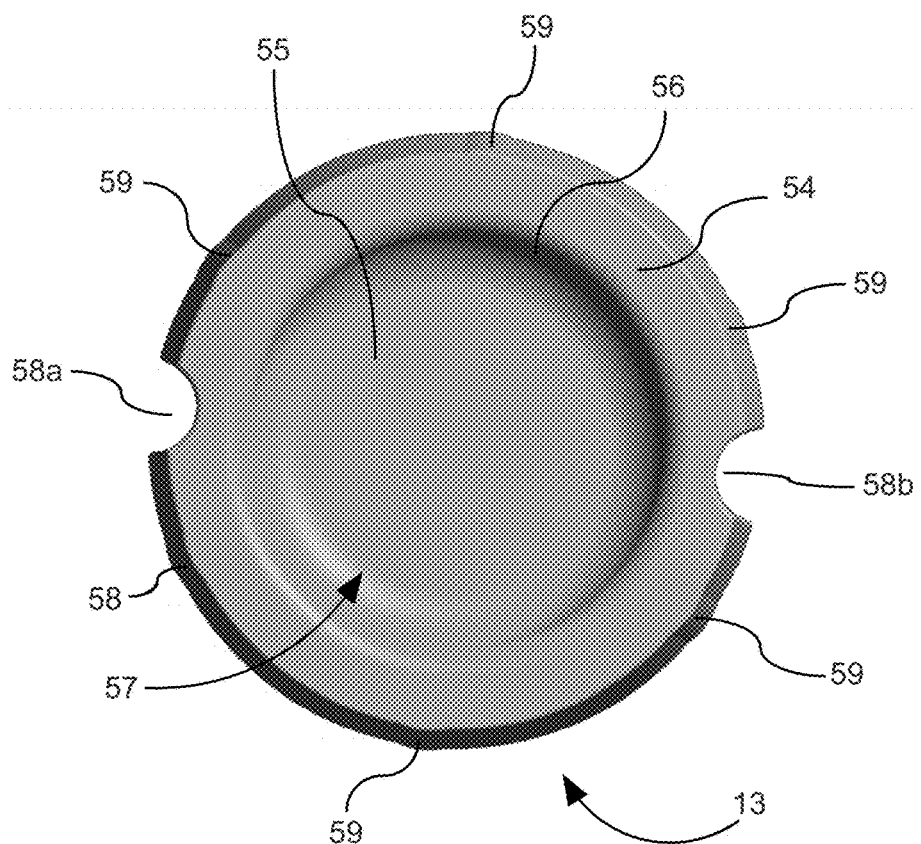
Figure 3G:
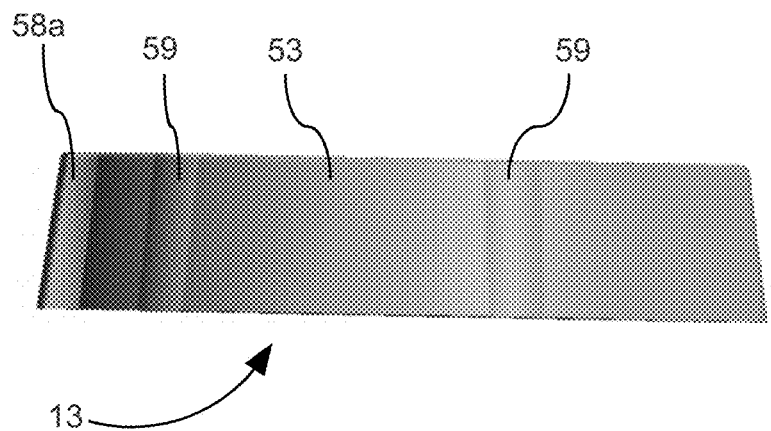
Figure 3H:
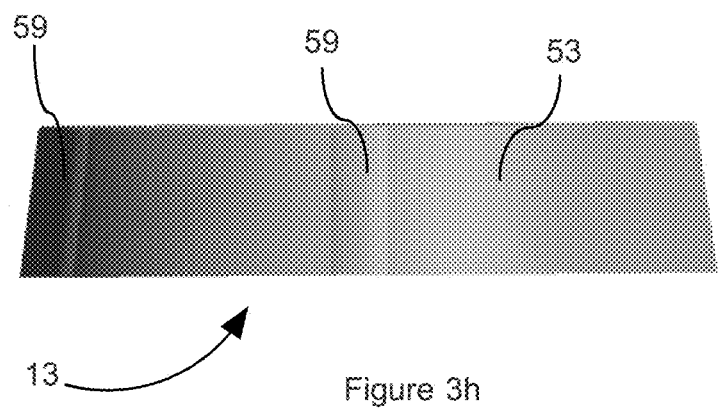

FIG. 1 shows an exemplary automobile bumper protection apparatus, generally identified by reference numeral 10, comprising a fastener housing assembly having anchor body 12 and cover 13. As shown inn FIGS. 2a-2g, anchor body 12 comprises exterior top wall 14, exterior bottom wall 16, with exterior side wall 18 extending therebetween. Top wall 14 comprises recessed annular section 19 having upper recessed annular section 20 with top interior peripheral wall 21, and lower recessed annular section 22 with bottom interior peripheral wall 23. Separating top interior peripheral wall 21 and bottom interior peripheral wall 23 is annular ledge 24. Upper recessed annular section 20 comprises an upper annular section diameter and lower recessed annular section 22 comprises a lower annular section diameter which is dimensioned less than the upper annular section diameter. The radial width of annular ledge 24 is equal to the difference between the dimensions of the two diameters. Exterior bottom wall 16 comprises ribs 25a-25d and hollowed-out sections 26a-26d.

Figure 4:
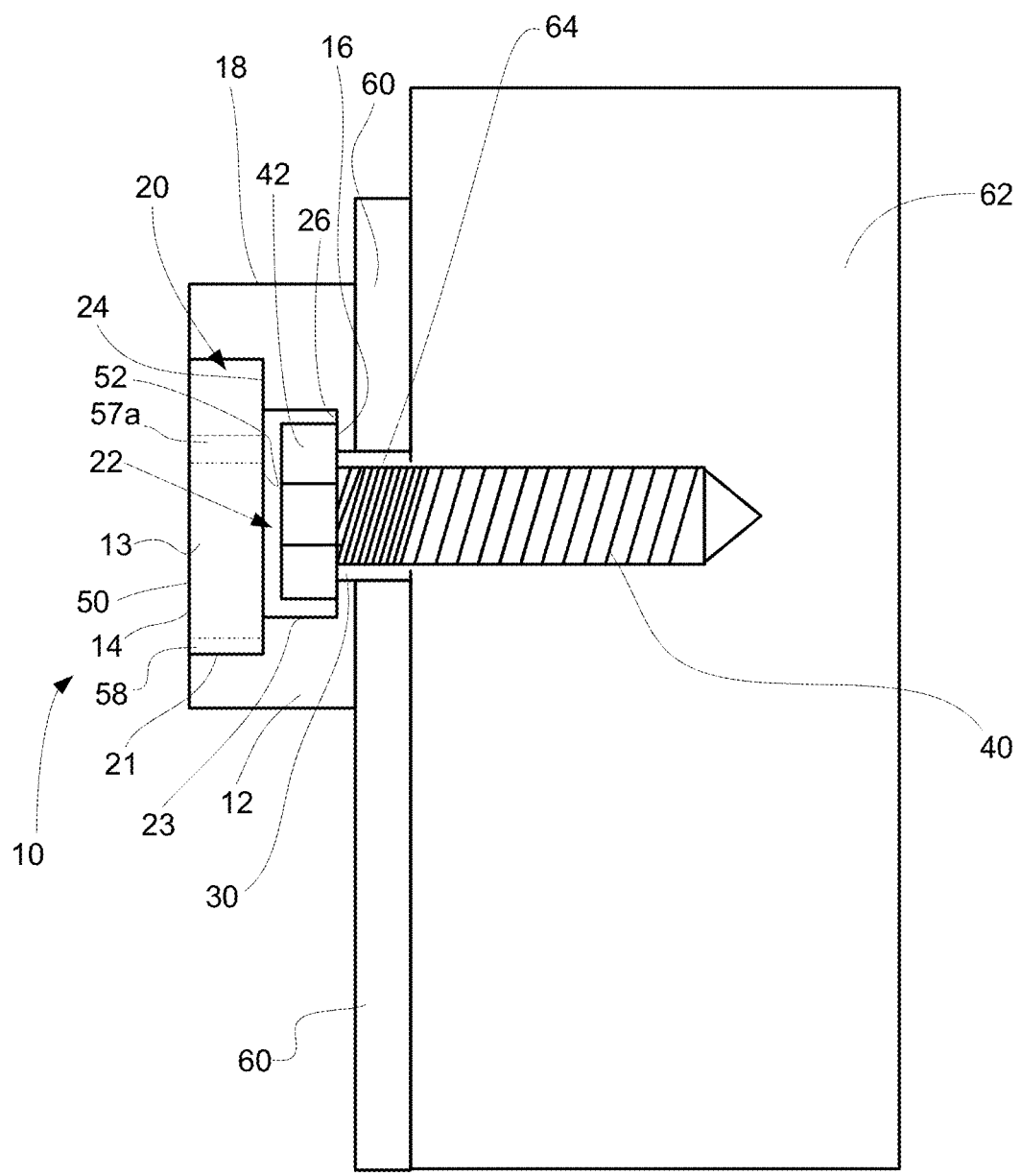
FIG. 4 shows a sectional view of the bumper protection apparatus of FIG. 1, in use.

Bottom interior peripheral wall 23 is formed with base wall 26 opposite exterior bottom wall 16. Accordingly, a generally graduated cylindrical void is defined by upper recessed annular section 20 and lower recessed annular section 22. Extending from base wall 26 to exterior bottom wall 16 is aperture 30, appropriately dimensioned to receive a fastener, such as exemplary screw 40, as shown in FIG. 4. Exemplary screw 40 comprises screw head portion 42 with top surface 43 and bottom surface 44 connected by edge wall 45, and shank portion 46 extending from bottom surface 44. Anchor body 12 and cover 13 are made from a resilient, yieldable or compressible cushion material suitable for absorbing impact forces and shocks, and is UV-resistant and resistant to chemical solvents. An exemplary material is a thermoplastic elastomer (TPE).

Now looking at FIGS. 3a-3h, there is shown cover 13 comprising exterior cover wall 50 and interior annular cover wall 52 with edge wall 53 therebetween. Cover 13 is appropriately dimensioned to fit snugly in anchor body 12 within upper recessed annular section 20. Exterior cover wall 50 comprises a substantially flat, planar surface. Interior annular cover wall 52 comprises annular interior cover wall portion 54 and interior recessed cover wall portion 55 coupled to each other via interior peripheral cover wall 56, such that interior recessed cover portion 57 is defined therebetween. Within edge wall 53 are two opposed notches 58a, 58b to facilitate removal of cover 13 from anchor body 12 by prying with an appropriate tool, in order to access head portion 42 for removal. Edge wall 55 also comprises opposed a plurality of protuberances 59 which abut upper interior peripheral wall 21 when cover 13 is engaged within anchor body 12, thereby minimizing the possibility of cover 13 from being accidentally removed or disengaged from upper recessed annular section 20.

FIG. 4 shows fastener housing assembly 10 in use for securing registration plate 60 to bumper 62 of a vehicle (not shown). Generally, plate 60 comprises a plurality of orifices 64 dimensioned to receive suitable fasteners 40. Accordingly, in operation, plate 60 is placed in position on bumper 62. Preferably, bumper 62 includes pre-drilled holes to receive fastener 40, in which case orifices 64 are lined up with the pre-drilled holes. Next, fastener 40 is introduced into fastener housing assembly 10 such that shank portion 44 is inserted through aperture 30 and orifice 64 of plate 60, and finally into bumper 62. Fastener 40 is driven into bumper 62 until head portion 42 rests on base wall 16, such that head portion 42 is contained within lower recessed annular section 22. With plate 60 secured by fastener 40 to bumper 62, cover 13 is fit snugly in anchor body 12 such that edge wall 55 of cover 13 and a plurality of protuberances 59 engage top interior peripheral wall 21 of upper recessed annular section 20. Accordingly, annular interior cover wall portion 54 rests on top surface 43 of head portion 42, and interior peripheral cover wall 56 abuts a portion of edge wall 45. In this configuration, cover 13 is generally contiguous with top wall 14 of body 12 to form a substantially flat, planar surface, that is exterior cover wall 50 is flush with exterior top wall 14 such that a substantially flat, planar surface is formed by the exterior cover wall 50 and the exterior top wall 14. Therefore, cover 13 effectively conceals head portion 42, and substantially protects fastener 40 from the elements and debris, thereby minimizing corrosion or degradation of fastener 40. Accordingly, in the event of an impact with another vehicle, cover 13 and anchor body 12 absorb the forces of the impact, and head portion 42 of fastener 40 does not come into contact with the other vehicle, thereby minimizing damage to the other vehicle, such as scratches, scuffing and dents.

Figure 5:
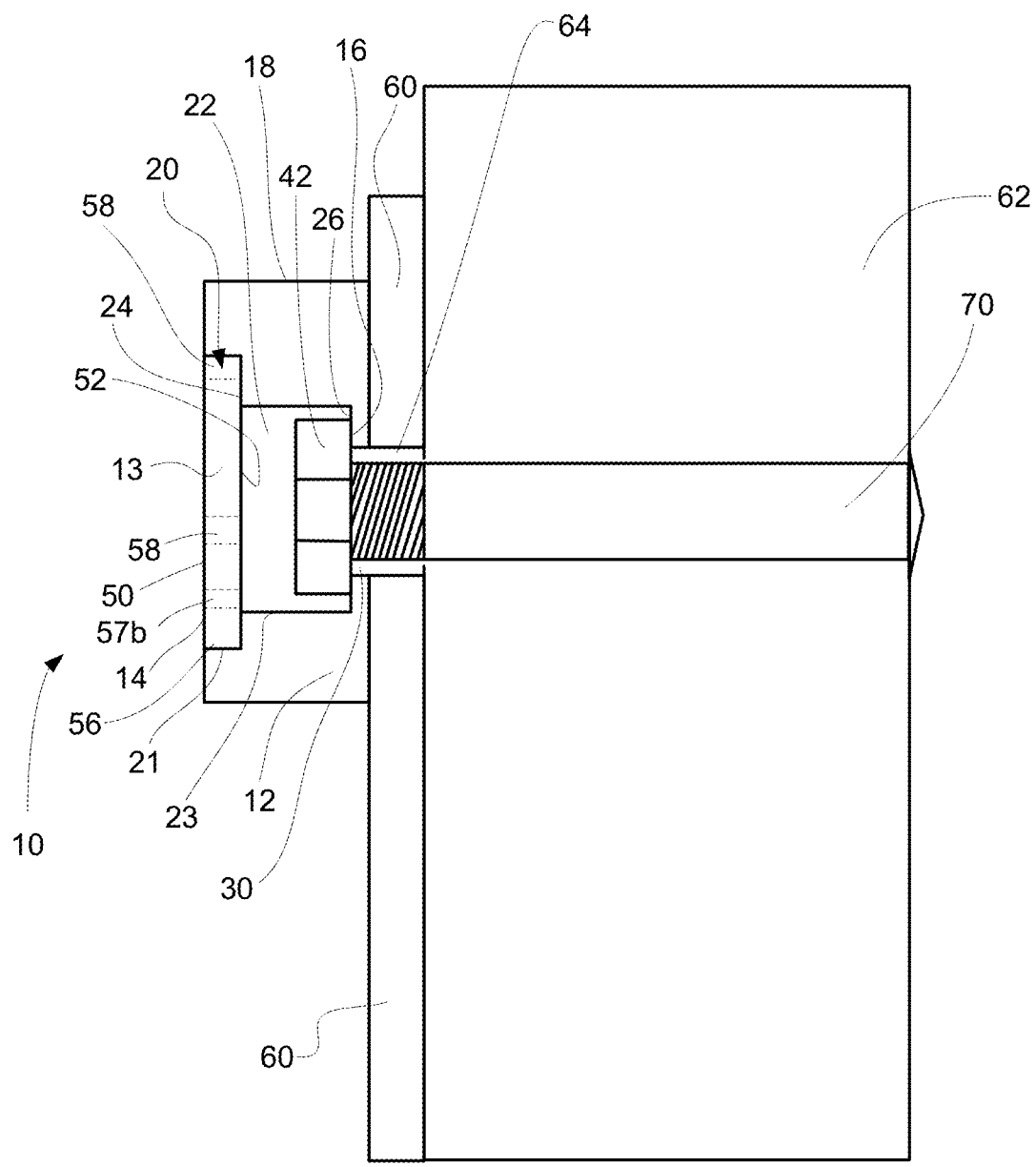
FIG. 5 shows a sectional view of a bumper protection apparatus, in use, in yet exemplary embodiment.

In another exemplary implementation, bumper 62 comprises protruding threaded bolts 70 secured thereto, for receiving plate 60 via orifices 64, as shown in FIG. 5. With bolts 70 engaged in orifices 64 of plate 60, anchor body 12 is received by each bolt 70 via aperture 30, and a suitable nut 72 is screwed onto bolt 70 until nut 72 rests on annular ledge 24, to contain nut 72 within lower recessed annular section 22. Subsequently, cover 13 is fit into anchor body 12, as described above.

In another exemplary implementation, lower recessed annular section 22 is dimensioned such that a void exists between interior cover wall 52 of cover 13 and head portion 42 of fastener 40, or nut 72. In this configuration, the head portion 42 of fastener 40, or nut 72 is countersunk to remain well within anchor body 12, and cover 13 and anchor body 12 absorb the forces of the impact, such that head portion 42 of fastener 40, or nut 72 are positioned further away from the other vehicle at impact.

In another exemplary implementation, cover 13 comprises a shape complimentary of recessed annular section 19, and dimensioned to fit within recessed annular section 19, while head portion 42 of fastener 40 or nut 72 is also accommodated within recessed annular section 19. Accordingly, in the implementations having upper recessed annular section 20 and lower recessed annular section 22 cover 13 may be abut top interior peripheral wall 21 and bottom interior peripheral wall 23, or portions thereof.

Figure 6:
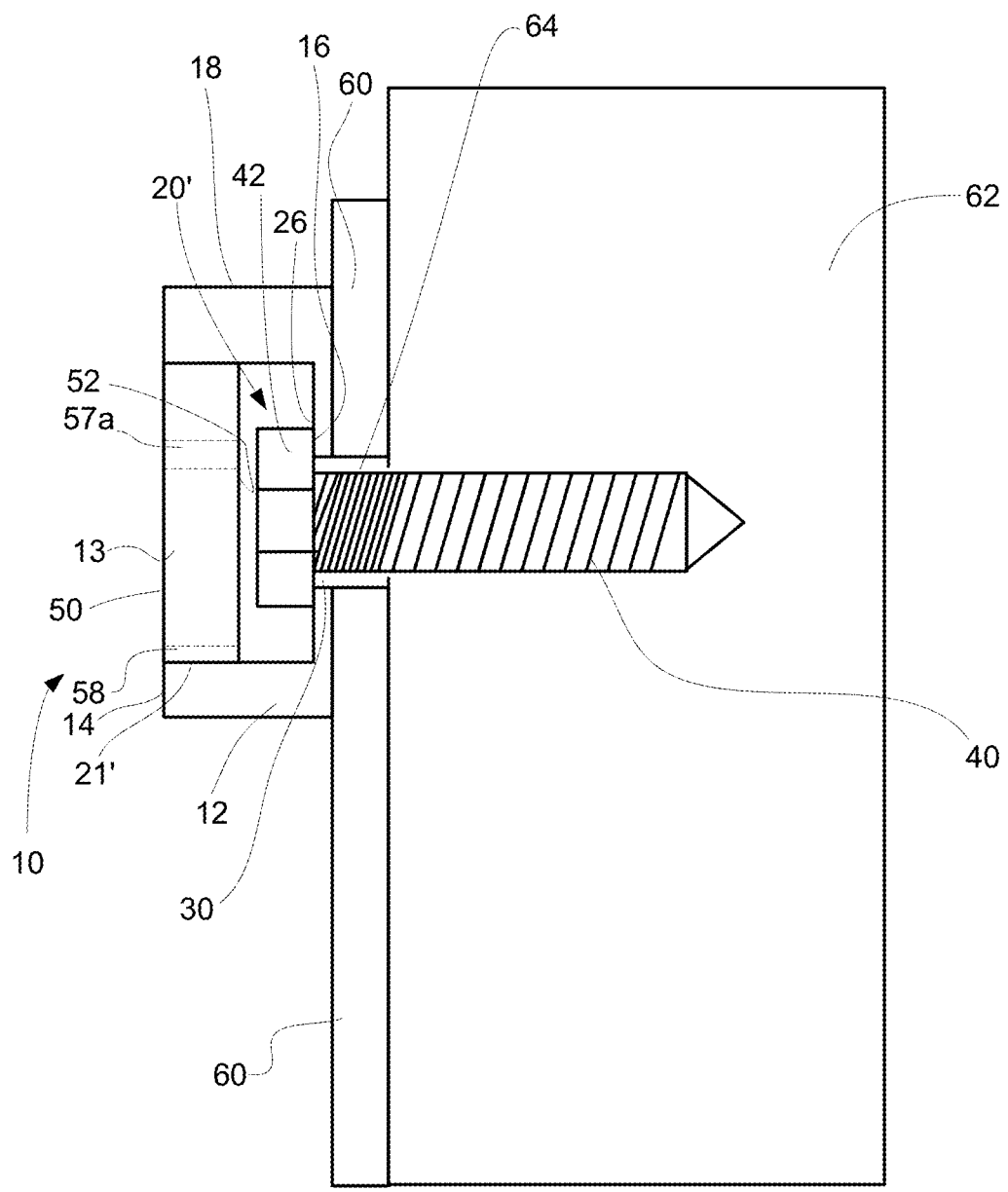
FIG. 6 shows a sectional view of the bumper protection apparatus, in use, in yet exemplary embodiment.
Figure 7:
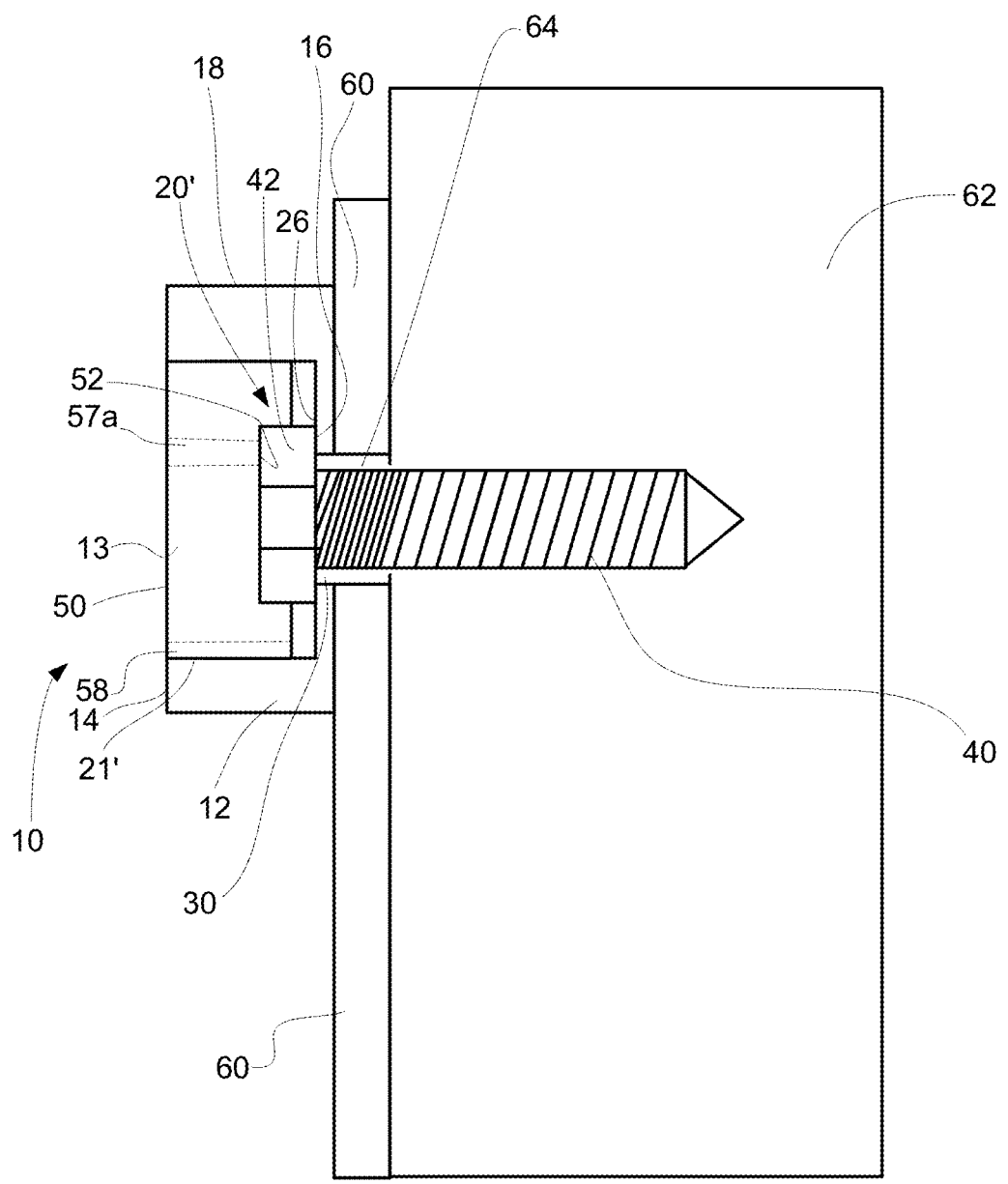
FIG. 7 shows a sectional view of the bumper protection apparatus, in use, in yet exemplary embodiment.

In another exemplary implementation, bumper protection apparatus 10 comprises anchor body 12 having exterior top wall 14, exterior bottom wall 16, with exterior side wall 18 extending therebetween. Top wall 14 comprises recessed annular section 20' with interior peripheral wall 21', and base wall 26 opposite exterior bottom wall 16. Accordingly, a generally graduated cylindrical void is defined by recessed annular section 20'. Extending from base wall 26 to exterior bottom wall 16 is aperture 30, appropriately dimensioned to receive a fastener, such as exemplary screw 40, as shown in FIG. 6. Accordingly, head portion 42 of fastener 40, or nut 72 and cover 13 are received in recessed annular section 20'. Cover 13 may be held in place within recessed annular section 20' by protuberances 59 such that a gap exists between interior recessed cover wall portion 55 and head portion 42 of fastener 40, or nut 72, while exterior cover wall 50 is flush with exterior top wall 14 such that a substantially flat, planar surface is formed by the exterior cover wall 50 and the exterior top wall 14. Accordingly, the head portion 42 of fastener 40, or nut 72 is countersunk to remain well within anchor body 12, and cover 13 and anchor body 12 absorb the forces of the impact, such that head portion 42 of fastener 40, or nut 72 are positioned further away from the other vehicle at impact. Alternatively, cover 13 may be dimensioned to abut head portion 42 of fastener 40, or nut 72, such that exterior cover wall 50 is flush with exterior top wall 14 such that a substantially flat, planar surface is formed by the exterior cover wall 50 and the exterior top wall 14, as shown in FIG. 7, in another exemplary implementation.

In another implementation, the anchor body 12, cover 13, recessed annular section 19, notches 58a, 58b, protuberances 59 may include any shape.

While these exemplary embodiments are described in sufficient detail to enable those skilled in the art to practice the invention, it should be understood that other embodiments may be realized and that logical and mechanical changes may be made without departing from the spirit and scope of the invention. The preceding detailed description is presented for purposes of illustration only and not of limitation, and the scope of the invention is defined by the preceding description, and with respect to the attached claims.

What is claimed is:

1. A bumper protection apparatus comprising:
   an anchor body;
   a cover;
   the anchor body comprising an exterior top wall, an exterior bottom wall, and an exterior side wall extending therebetween, wherein the exterior top wall comprises a recessed annular section with a base wall, and an aperture extending between the base wall and the exterior bottom wall;
   wherein the cover is received by the recessed annular section;
   wherein the recessed annular section comprises an upper section with an upper interior peripheral wall and a lower section with a bottom interior peripheral wall connected to the upper interior peripheral wall by an annular ledge;
   wherein the upper section comprises a first diameter and the lower section comprises a second diameter, and wherein the first diameter is greater than the second diameter; and wherein the annular ledge comprises a radial width equal to a difference in dimensions between the first diameter and the second diameter;
   wherein the cover comprises an exterior cover wall and an interior cover wall with an edge wall therebetween, and wherein the cover is dimensioned to fit within the upper section; and
   wherein the interior cover wall comprises an annular interior cover wall portion and an interior recessed cover wall portion coupled to each other via an interior peripheral cover wall.

2. The bumper protection apparatus of claim 1, wherein the edge wall comprises at least one protuberance, wherein the at least one protuberance abuts the upper interior peripheral wall.

3. The bumper protection apparatus of claim 1, wherein the edge wall comprises at least one notch.

4. The bumper protection apparatus of claim 1, wherein the recessed annular section and the aperture receive a fastener comprising a head portion and a shank portion.

5. The bumper protection apparatus of claim 1, wherein the recessed annular section and the aperture receive a fastener comprising a head portion and a shank portion, and wherein a substantial portion of the head portion is received by the lower section and cover is substantially received within the upper section.

6. The bumper protection apparatus of claim 1, wherein the recessed annular section and the aperture receive a fastener comprising a head portion and a shank portion, and wherein a substantial portion of the head portion is received by the lower section and cover is received within the upper section and a portion of the lower section.

7. The bumper protection apparatus of claim 1, wherein the exterior cover wall is flush with the exterior top wall such that a substantially flat, planar surface is formed by the exterior cover wall and the exterior top wall.

8. The bumper protection apparatus of claim 1, wherein the anchor body and the cover are made from a resilient, yieldable and compressible material suitable for absorbing impact forces and shocks.

9. A method for minimizing damage to a vehicle, the method comprising:
positioning a license plate having at least one aperture against a bumper;
positioning at least one anchor body on the bumper, the anchor body comprising an exterior top wall, an exterior bottom wall, and an exterior side wall extending therebetween, wherein the exterior top wall comprises a recessed annular section with a base wall; and an orifice extending between the base wall and the exterior bottom wall, wherein the recessed annular section comprises an upper section with an upper interior peripheral wall and a lower section with a bottom interior peripheral wall connected to the upper interior peripheral wall by an annular ledge;
aligning the orifice of the least one anchor body with the at least one aperture of the license plate;
introducing a fastener comprising a head portion and shank portion into at least one anchor body such that the shank portion is received by the orifice and at least one aperture and secured with the bumper until the head portion abuts the annular ledge;
securing a cover in the recessed annular section;
wherein the upper section comprises a first diameter and the lower section comprises a second diameter, and wherein the first diameter is greater than the second diameter; and wherein the annular ledge comprises a radial width equal to a difference in dimensions between the first diameter and the second diameter;
wherein the cover comprises an exterior cover wall and an interior cover wall with an edge wall therebetween, and wherein the cover is dimensioned to fit within the upper section; and
wherein the interior cover wall comprises an annular interior cover wall portion and an interior recessed cover wall portion coupled to each other via an interior peripheral cover wall.

10. The method of claim 9, wherein the exterior cover wall is flush with the exterior top wall of the at least one anchor body such that a substantially flat, planar surface is formed by the exterior cover wall and the exterior top wall.

11. The method of claim 9, wherein the at least one anchor body and the cover are made from a resilient, yieldable and compressible material suitable for absorbing impact forces and shocks.

12. A fastener housing assembly comprising:
an anchor body;
a cover;
the anchor body comprising an exterior top wall, an exterior bottom wall, and an exterior side wall extending therebetween, wherein the exterior top wall comprises a recessed annular section with a base wall, and an aperture extending between the base wall and the exterior bottom wall;
wherein the recessed annular section comprises an upper section with an upper interior peripheral wall and a lower section with a bottom interior peripheral wall connected to the upper interior peripheral wall by an annular ledge;
wherein the cover is received by the recessed annular section;
wherein the cover comprises an exterior cover wall and an interior cover wall with an edge wall therebetween, and wherein the cover is dimensioned to fit within the upper section; and
wherein the edge wall comprises protuberances, wherein the protuberances abut the upper interior peripheral wall.

13. The fastener housing assembly of claim 12, wherein the edge wall comprises at least one notch.

14. The fastener housing assembly of claim 12, wherein the anchor body and the cover are made from a resilient, yieldable and compressible material suitable for absorbing impact forces and shocks.

15. The fastener housing assembly of claim 12, wherein a fastener comprising a head portion and shank portion is introduced into the anchor body such that the shank portion is received by the aperture and the head portion is accommodated in the lower section, and the cover is received by the upper section of the recessed annular section.

16. The fastener housing assembly of claim 12, wherein the exterior cover wall is flush with the exterior top wall such that a substantially flat, planar surface is formed by the exterior cover wall and the exterior top wall.

17. The fastener housing assembly of claim 12, wherein a substantial portion of a head portion of a fastener is received by the lower section.

18. The fastener housing assembly of claim 12, wherein a head portion of a fastener is received by the lower section.

* * * * *